(12) United States Patent
Schak

(10) Patent No.: US 7,722,057 B2
(45) Date of Patent: May 25, 2010

(54) TRUCK DOLLY SAVING METHOD AND APPARATUS

(76) Inventor: Dale Robert Schak, 106 Jean St., Tyler, MN (US) 56178

( * ) Notice: Subject to any disclaimer, the term of this patent is extended or adjusted under 35 U.S.C. 154(b) by 299 days.

(21) Appl. No.: 11/759,112

(22) Filed: Jun. 6, 2007

(65) Prior Publication Data

US 2007/0290482 A1   Dec. 20, 2007

Related U.S. Application Data

(60) Provisional application No. 60/804,027, filed on Jun. 6, 2006.

(51) Int. Cl.
 *B60G 17/00* (2006.01)
(52) U.S. Cl. .................................. 280/6.157
(58) Field of Classification Search ............. 280/5.514, 280/6.151, 6.153, 6.157, 754, 755, 763.1
See application file for complete search history.

(56) References Cited

U.S. PATENT DOCUMENTS

| | | | |
|---|---|---|---|
| 2,934,356 A * | 4/1960 | Killinger | 280/6.15 |
| 3,224,522 A * | 12/1965 | Fleming | 180/24.02 |
| 3,627,268 A | 12/1971 | Wills | |
| 3,787,030 A | 1/1974 | Bieker | |
| 3,833,237 A * | 9/1974 | Sweet et al. | 280/5.514 |
| 4,113,274 A | 9/1978 | Vahrenkamp | |
| 4,318,550 A * | 3/1982 | Jacobsen | 280/766.1 |
| 4,619,467 A * | 10/1986 | Lafferty | 267/24 |
| 4,641,843 A * | 2/1987 | Morrisroe, Jr. | 280/5.514 |
| 4,783,089 A * | 11/1988 | Hamilton et al. | 280/6.157 |
| 4,928,488 A | 5/1990 | Hunger | |
| 5,052,713 A * | 10/1991 | Corey et al. | 280/5.5 |
| 5,125,679 A | 6/1992 | Delano | |
| 5,217,209 A | 6/1993 | Anders | |
| 5,346,246 A * | 9/1994 | Lander et al. | 280/124.157 |
| 5,375,880 A * | 12/1994 | Fleener et al. | 280/5.514 |
| 5,401,046 A | 3/1995 | Schwartz et al. | |
| 5,575,493 A | 11/1996 | Schwartz et al. | |
| 6,007,073 A * | 12/1999 | Gunter | 280/6.153 |
| 6,056,501 A * | 5/2000 | Ishikawa et al. | 414/636 |
| 6,068,276 A * | 5/2000 | Kallstrom | 280/124.157 |
| 6,142,501 A | 11/2000 | Fogo et al. | |
| 6,783,138 B2 * | 8/2004 | Reiner et al. | 280/124.16 |
| 6,948,702 B1 | 9/2005 | Nigro | |

* cited by examiner

*Primary Examiner*—Paul N Dickson
*Assistant Examiner*—Robert A Coker
(74) *Attorney, Agent, or Firm*—Schwegman, Lundberg & Woessner, P.A.

(57) ABSTRACT

An apparatus and method for lessening wear on a dolly on a trailer. The apparatus and method also saves the dolly on the trailer.

10 Claims, 9 Drawing Sheets

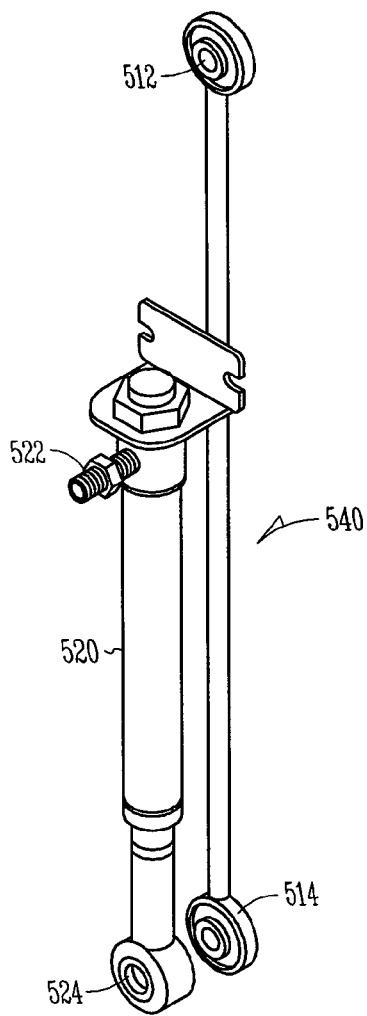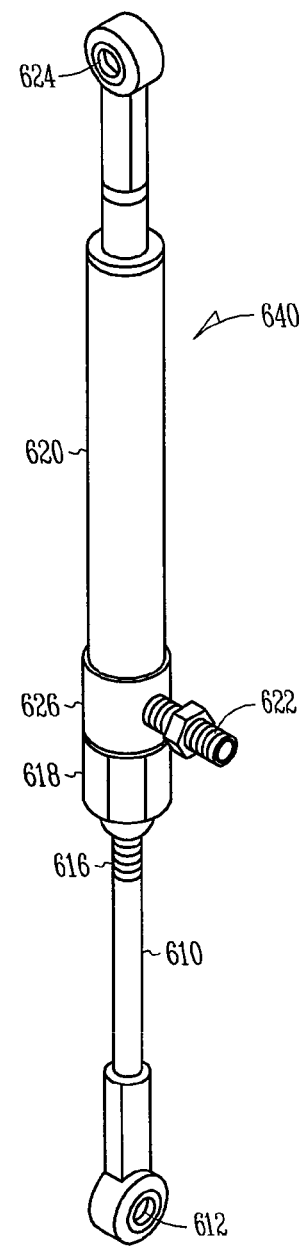
FIG. 5
FIG. 6

US 7,722,057 B2

TRUCK DOLLY SAVING METHOD AND APPARATUS

RELATED APPLICATIONS

This application claims the benefit of U.S. Provisional Application Ser. No. 60/804,027 filed on Jun. 6, 2006 under 35 U.S.C. 119(e).

BACKGROUND

Semi tractor trailers are loaded and coupled to semi tractors. The semi tractor truck can then be used to move the trailer and the content of the trailer to any desired location. Semi tractors and trailers are used widely in moving commercial goods. Semi tractors and trailers can also be used to move livestock to markets or move a family's personal belongings to a new house hundreds or even thousands of miles away.

Operators of semi trucks, in many instances, disconnect a semi trailer. For example, the operators of semi trucks generally make money while hauling loaded trailers from one spot to another. Therefore, the operator may disconnect a loaded semi trailer when it has reached a destination. The trailer can then be unloaded while the operator of the semi moves another loaded trailer elsewhere. In another instance, the operator may disconnect an empty semi trailer at a location. The trailer can be loaded while the semi tractor is used for other jobs. The operator can then come back and reconnect the now loaded semi trailer and haul it to a selected destination.

Many semi trailers are without a front axle and without front wheels. Generally, the weight of the semi trailer is borne by a fifth wheel on a semi tractor when the semi trailer is attached to the semi tractor. When disconnected, legs known as dollies are used to hold up the end of the semi trailer without the front axle or front wheels. When a full trailer is supported by the legs, a large force is carried on the legs. The semi tractor is generally backed into position where the semi trailer can be attached to the fifth wheel. The chore that remains includes retracting the legs to place the full weight of the semi trailer onto the fifth wheel portion of the semi tractor. A set of gears are turned to retract the legs. When the semi-trailer is loaded, the gears are very difficult to turn. Semi tractor operators can get hurt exerting the amount of force needed to turn the gears to retract the legs. If the semi tractor operator is an employee of a company, workman's compensation claims can result. This can be costly to the owner of a fleet of semi tractors. In addition to potential injuries to semi tractor operators, the large forces needed to turn the gears associated with the dollies can strip the gears. This is again costly in that the parts are expensive and must be replaced before moving the semi trailer. This wastes an operators time in addition to incurring the repair cost. Customers may also be disappointed as the arrival of their freight or cargo in the semi trailer may be delayed. Again, this can result in additional monetary losses if a contract covering the transaction includes penalty costs for delaying shipment. Even if the gears are not stripped, turning the gears under a heavy load wears the gears so that their life is shortened. In other words, the time between stripping the gears associated with the dollies may be shorter than necessary.

SUMMARY

Semi tractor trailers are equipped with a Truck Dolly Saving Method And Apparatus which removes the load on the truck dollies so an operator can easily turn the gears after hitching a semi trailer to a semi tractor.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures, and:

FIG. 5 is an illustration of a variable length rod used to provide feedback to the air leveling system of a semi tractor truck with respect to the distance between the frame and the axles of the semi tractor truck, according to an example embodiment.

FIG. 6 is an illustration of a variable length rod used to provide feedback to the air leveling system of a semi tractor truck with respect to the distance between the frame and the axles of the semi tractor trailer, according to another example embodiment.

The description set out herein illustrates the various embodiments of the invention, and such description is not intended to be construed as limiting in any manner.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural and electrical changes may be made without departing from the scope of the present invention. The following description is, therefore, not to be taken in a limited sense, and the scope of the present invention is defined by the appended claims.

Figure 1:
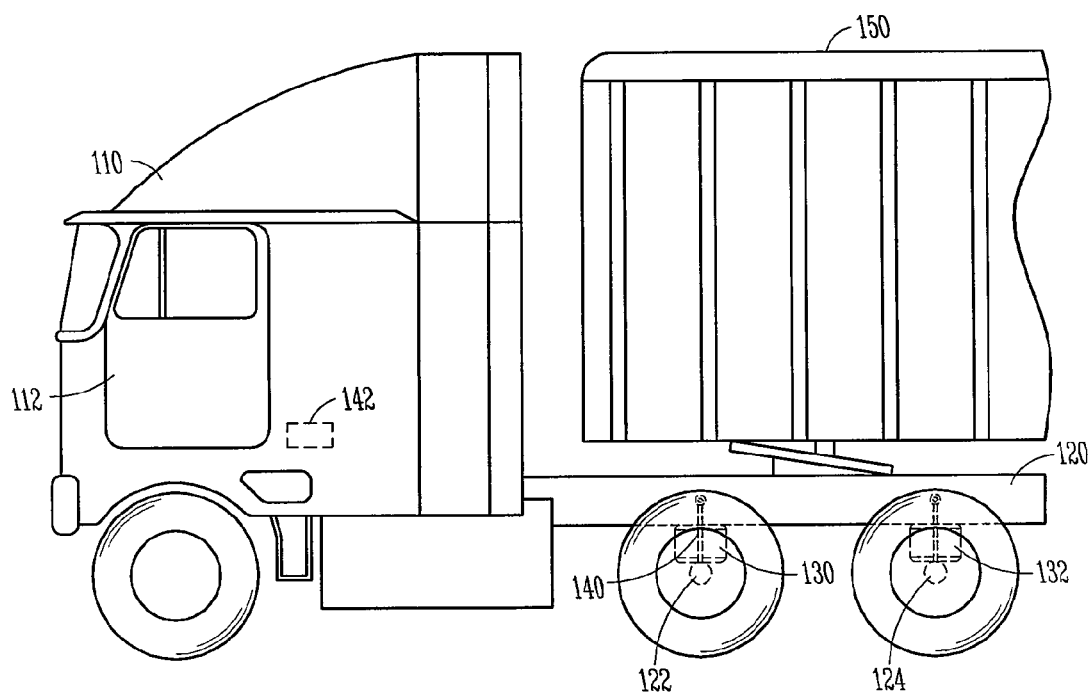
FIG. 1 is a schematic diagram of a semi trailer attached to a semi tractor that is equipped with a dolly saver apparatus, according to an example embodiment.

FIG. 1 is a schematic diagram of a semi trailer 150 attached to a semi tractor 110 that is equipped with a dolly saver 140, according to an embodiment of this invention. The semi tractor 110 includes a frame 120. Axels 122 and 124 are attached to the frame and carry corresponding wheels. Attached between the axels 122, 124 and the frame 120 is an air bag 130 which is inflated or deflated as the semi tractor 110 tows the semi trailer 150. Air bag 130 is associated with axel 122. A similar airbag 132 is associated with axel 124. As shown in FIG. 1, there are two airbags 130 and 132. In actuality there are at least four airbags. The airbags 130, 132 are on one side of the semi tractor and other corresponding airbags are associated with axels 122 and 124 on the other side of the semi tractor. The air bags are attached between the axels. The airbag 130 is attached between the axel 122 and the frame 120. Similarly, the airbag 132 is attached at one end to the axel 124 and to the other frame 120. The dolly saving apparatus 140 is attached to the axel 122 and to the frame 120. The semi tractor 110 includes a cab 112. A set of controls 142 used to operate the dolly saver 140 is located within the cab 112. As a result, the operator of a semi tractor 110 can control the dolly saver 140 from the cab. Preferably, the controls 142 are located on the floor of the cab such that the operator can easily reach the controls from outside the cab. In other words, in order to control the dolly saver 140, the operator does not necessarily have to be inside the cab.

Figure 2:
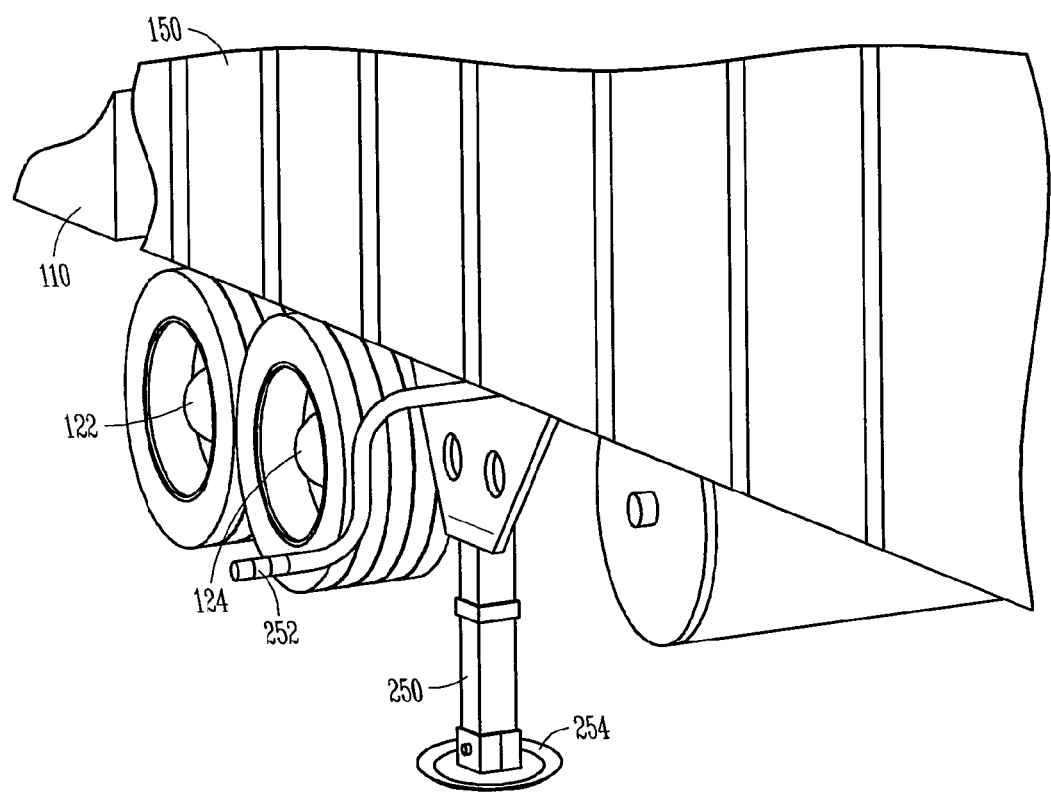
FIG. 2 is an illustration of a dolly on a semi trailer with a handle engaged.

FIG. 2 is an illustration of a dolly 250 on a semi trailer 150 with a handle 252 engaged with the dolly 250. The dolly has a foot 254 which is essentially a curved plate capable of adapting to several different surfaces. The foot 254 is also relatively large so as to lessen the pressure on the plate and prevent the trailer end supported by the dolly 250 from sinking into a surface on which the dolly foot 254 is placed. The dolly 250 is basically a stand used to hold up the end of the tractor trailer 150 which is devoid of wheels. The dolly 250 holds the free end or end of the semi trailer 150 devoid of wheels up in a substantially level position when the semi trailer 150 is unattached or disconnected from the semi tractor 110. The dolly 250 is retractable so as not to interfere with hauling operations when the semi trailer 150 is attached to the semi tractor 110. It should be noted that there are typically two dollies 250. One dolly is located on one side of the semi trailer 150, and another dolly (not shown in FIG. 2) is located on the other side of the semi trailer 150. The dolly 250 includes a set of gears. Turning the handle 252 turns the gears which in turn place the dolly 250 in its retracted position. It will be appreciated that many times the trailer 150 is detached from the semi tractor 110 when the trailer 150 is empty. The trailer 150 is then loaded, which in turn places a large force on the dolly 250. When the large force is placed on the dolly 250, many times it is very difficult or nearly impossible to turn the handle 252. In other words, loading the dolly also loads the gears associated with the dolly 250.

Figure 3:
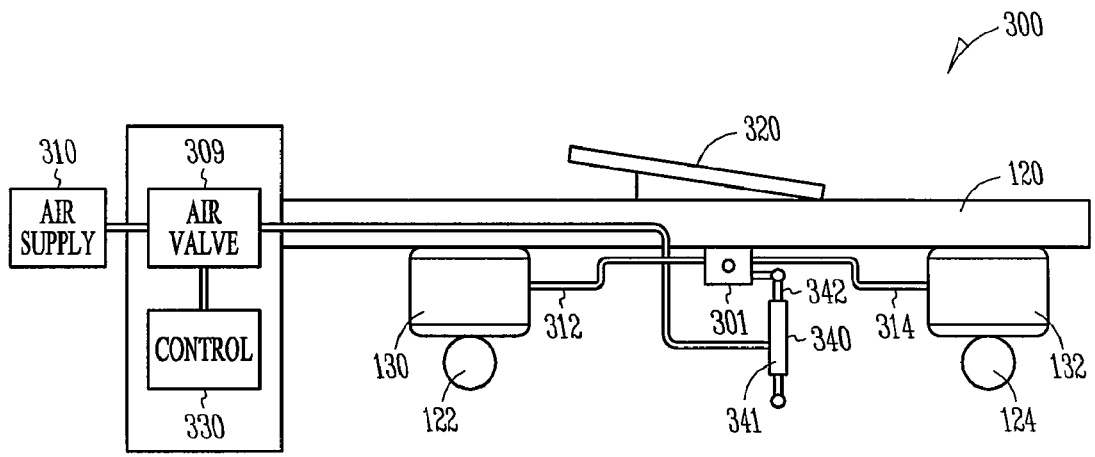
FIG. 3 is a schematic of the air leveling system of a semi tractor that includes the dolly saver, according to an example embodiment.

FIG. 3 is a schematic of an air leveling system that includes the dolly saver 340, according to an example embodiment. Leveling system 300 includes the airbag 130, which is attached between the axel 122 and the frame 120 and the airbag 132, which is attached between the axel 124 and the frame 120 of the semi tractor 110. Attached to the frame 120 is a fifth wheel trailer hitch 320. The fifth wheel 320 is capable of receiving the A hitch associated with the semi trailer 150. The leveling system also includes an air supply 310 and a control mechanism 330. The leveling system 300 also includes an air leveling valve 301, an actuator arm 302 (FIG. 7), and the dolly saver 340. The dolly saver 340 is a variable length rod. The dolly saver includes a rod 342 and an air cylinder 341. The dolly saver is attached to the axle of the tow vehicle on one end. The other end of the dolly saver 340 is attached to the actuator arm 302 of the air leveling system 300. The air leveling system 300 also includes air lines 312 and 314 that are attached to the air leveling valve 301, and, when the valve is opened, supply air to the airbags 130 and 132, respectively, with compressed air. The controller 330 opens and closes an air valve associated with the air supply 310. In one embodiment, the air supply 310 is the same air supply for the seat in the cab of a semi tractor trailer truck. The air supply line is provided with a T-fitting and then to an air valve 309 controlled by the control mechanism and further detailed below. The controller 330 receives input or a call for air from the individual air bags 130 and 132. In response to the inputs, the controller opens the air valve 309 with respect to the air supply 310 to either add more air to the air bag or remove air from a particular air bag. In actuality, as mentioned previously, for a particular air leveling system 300 are actually four air bags. Two airbags are associated with each axel 122 and 124. The airbags are located on each end of a particular axel 122, 124. The air leveling system 300 allows the trailer 150 to remain engaged with the fifth wheel hitch 320. In addition, the airbags 130, 132 and the others not shown also absorb shock or dampen shocks that may be otherwise transferred from the semi trailer 150 to the semi truck 110.

Figure 9A:
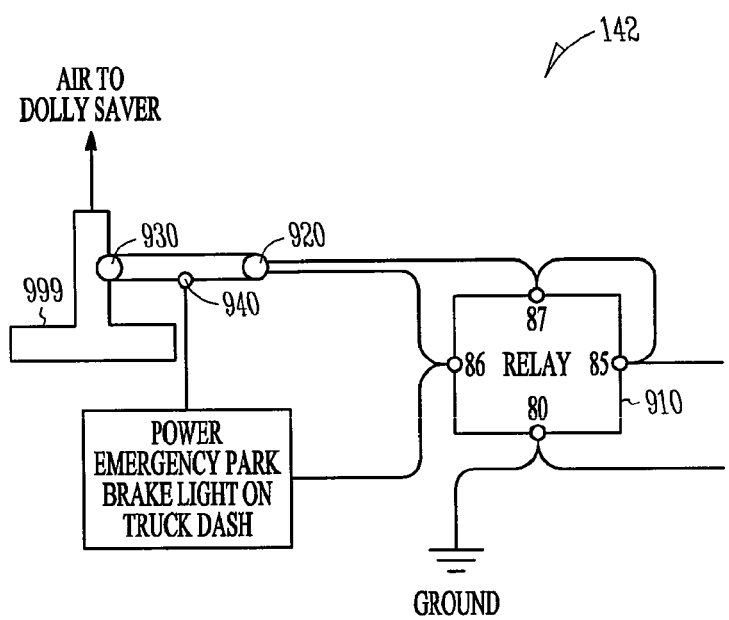
FIG. 9A is a schematic diagram of an operator control mechanism, according to an example embodiment.

The air leveling system 300 also includes a variable length rod 340. The variable length rod 340 includes an air cylinder 341. The air cylinder 341 is attached to the air supply 310 and controlled by a separate controller 142 (FIG. 9A). While hauling the tractor trailer 150, the variable length rod 340 is maintained at a fixed length. The variable length rod 340 is attached at one end to the frame 120 of the truck and at the other end to the air leveling system. The fixed length associated with the variable length rod maintains a specified distance between the frame 120 and the axel or axels 122, 124. The variable length rod 340 is not supplied with air during hauling operations. As a result, the variable length rod stays at its shortest length during hauling operations so as to maintain a manufacturer's specified distance between the axels 122, 124 and the frame 120 of the semi tractor 110 (shown in FIGS. 1 and 2). The controller 142 supplies air to the air cylinder 341 only under certain conditions, such as when the parking brake on the semi tractor is engaged. When the parking brake is not engaged, the controller 330 is also disengaged, which in turn deflates or makes sure that there is no air in the air cylinder 341 of the variable length rod 340. Thus, the changeable length or air cylinder 341 can be used to change the length only under certain conditions, such as when the parking brake is on.

Figure 4:
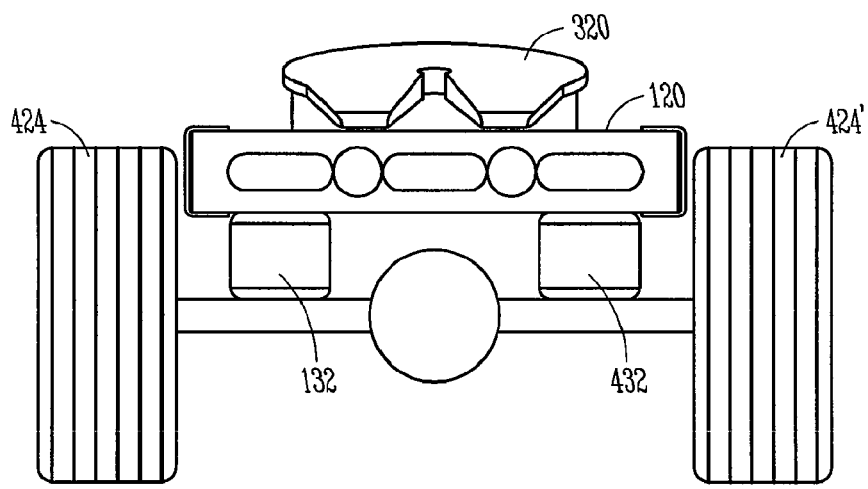
FIG. 4 is an illustration of a portion of the air leveling system of a truck, according to an example embodiment.

FIG. 4 is an illustration of a portion of the air leveling system 300 or a semi tractor truck 110, according to an example embodiment of the invention. FIG. 4 shows the semi tractor 110 and its frame 120. Also shown is the fifth wheel hitch 320. An airbag 132 is located on one side of an axel 124, and another airbag 432 is attached to the other end of the axel 124. The axel 124 is not shown in FIG. 4. However, the wheels 424 and 424' are attached to the axel.

FIG. 5 is an illustration of a variable length rod 540 used to provide feedback to the air leveling system 300 of a semi tractor truck 110, with respect to the distance between the frame 110 and the axel or axels of the semi tractor truck 110, according to an example embodiment. The changeable length rod 540 includes a fixed rod 510 (FIG. 7) and an air cylinder 520. The air cylinder 520 includes an air inlet 522. The air cylinder also has an attachment end 524. The fixed rod 510 includes a first attachment end 512 and a second end 524, which is unattached as part of the dolly saving or air leveling system 300. The fixed rod 510 is what is found on many trucks. The fixed rod 510 is of a specific length so that the distance between the frame and the axels is maintained. According to an embodiment of the invention, the air cylinder 520 is attached to the fixed length rod 510. The end 514 of the fixed length rod 510 is detached and the end 524 of the air cylinder 520 is reattached to the axel or transmission. In other words, the air cylinder is reattached to the semi tractor at the same point as where end 514 was previously attached. It should be noted that air cylinder 520 is attached to the fixed rod 510 so that the attachment end 524 is approximately the same length as the distance between the attachment end 512 and the end 514 of the fixed rod 510.

FIG. 6 is an illustration of another embodiment of a variable length rod 640 used to provide feedback to the air leveling system 300 of the semi tractor truck 110 with respect to the distance between the frame 120 and the axels of the semi tractor truck 110, according to another example embodiment. The variable length rod 640 includes an air cylinder 620 and a fixed rod portion 610. The fixed rod portion 610 has an attachment end 612 and a threaded end 616, as well as a fastener 618. The cylinder has an attachment end 624 and an end 626 which attaches to the fastener 618. The fastener 618 attaches to the end 626 in a secure fashion. The fixed length rod 610 can be adjusted by screwing or unscrewing the rod 610 into and out of a threaded opening in the fastener 618. In this fashion, slight adjustments can be made to the overall length of the changeable length rod 640. The air cylinder 620 also includes an air inlet 622. As shown, an air tube from an air supply 310 (shown in FIG. 3) is also attached to the changeable length rod 640.

Figure 7:
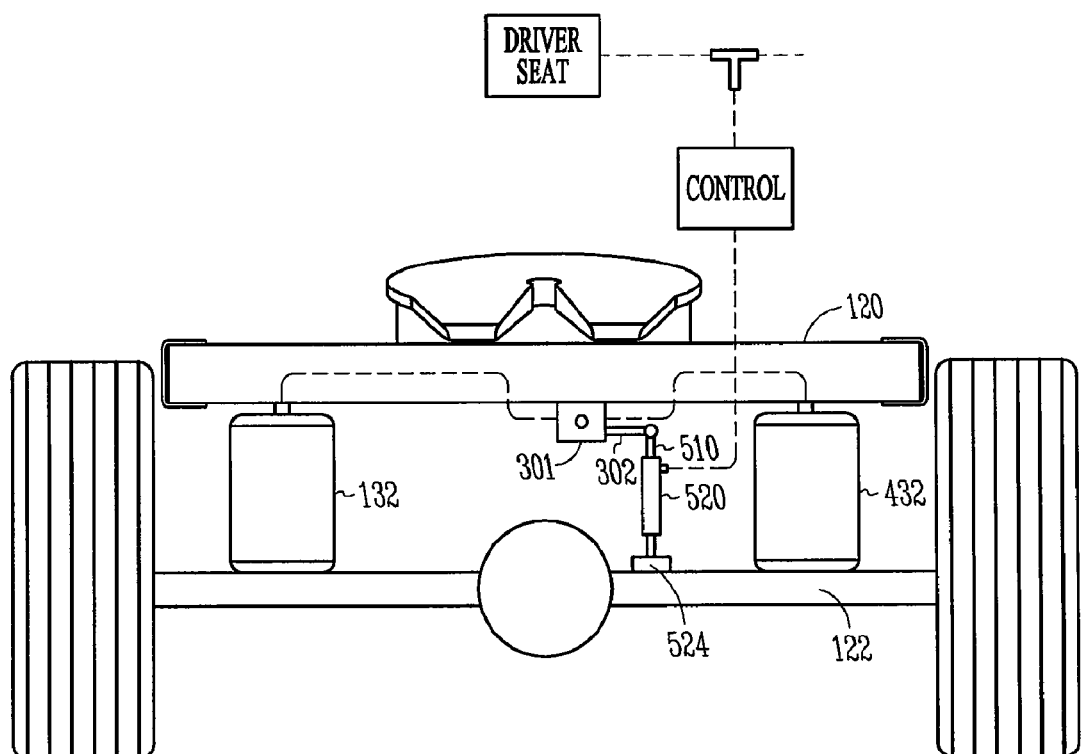
FIG. 7 is an illustration of a variable length rod as attached to an axel and to a portion of the air leveling system, according to an example embodiment.

FIG. 7 is an illustration of a variable length rod 540 as attached to an axel 122 and to a portion of the air leveling system 300. The end 524 is attached to the axel 122. The end 514 is unattached. The air cylinder 520 is attached to the fixed rod 510 along the length of the rod. The end 512 is attached to the actuator arm 302 of the air leveling system 300. The actuator arm 302 is attached to an air leveling valve 301 which supplies air to the air bags, such as 132 and 432, of the air leveling system 300. The changeable length rod 540 is at its shortest point or shortest length when the air cylinder 520 is not provided with air. When it is at its shortest length, the distance between the frame 120 of the truck and the axel 122 will be maintained at a specified distance. If the frame is too low with respect to the truck or axel 122, the relative distance causes a lever arm associated with the air leveling system to be moved to a position where it signals to the air leveling system that the frame is either too high or too low. The actuator arm 302 is an actuator that, when moved, either inflates the various bags such as airbags 132, 432 or deflates the various air bags 132, 432 to raise or lower the frame 120 with respect to the axel 122. At the particular position where the distance is substantially correct, or substantially the selected distance, the actuator arm 302 is not in a position where it will engage the air leveling system to pressurize or depressurize or provide air or release air from the airbags 132, 432.

Figure 8:
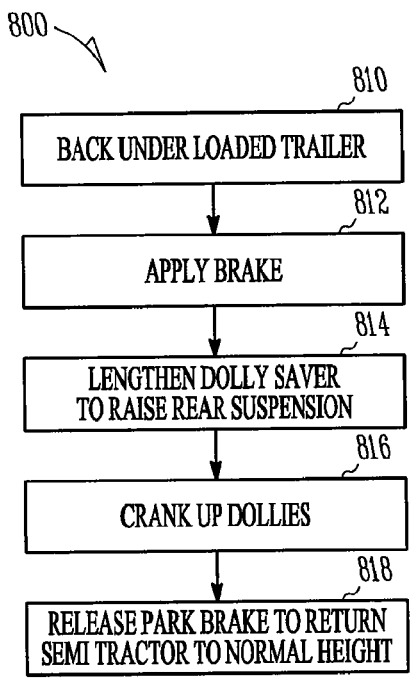
FIG. 8 is a flow diagram of a method for removing the load from the dollies of a semi trailer, according to an example embodiment.

FIG. 8 is a flow diagram of a method 800 for removing the load from the dolly, such as dolly 250, according to an example embodiment. A semi tractor is backed under a loaded trailer, as depicted by reference numeral 810, and the park brake is applied as depicted by reference numeral 812.

The dolly saver is then lengthened to raise the rear suspension or rear portion of the frame of a tow vehicle, such as a semi tractor trailer truck, as depicted by reference numeral 814. Raising the rear suspension or the frame removes the load from the dollies. As a result, the dollies are then cranked up, as depicted by reference numeral 816. The dollies are cranked up with little or no effort because the weight has been removed from them. The park brake is then released to return the tractor trailer to its normal height, as depicted by reference numeral 818. The dolly saver is lengthened by providing air to the air cylinder of the dolly saver. For example, looking at the dolly saver 540, air is provided to the cylinder 520 to add an additional length to the variable length rod 540. This additional length moves the lever arm (see FIG. 7) of the air leveling system 300. Moving the lever arm signals the air leveling system 300 that the distance between the frame 120 and the axel 122 of the semi tractor 110 is too low. In actuality, it is not too low but by lengthening the cylinder the air leveling system 300 is signaled that it is too low and inflates the air bags, such as air bag 130 to lift the frame 120. Lifting the frame 120 also lifts the semi trailer 150 and, when the fifth wheel is positioned below the semi trailer 150, also lifts the dollies 250 off the ground so that there is little, if any, load on the dolly other than its own weight. With the load on the dollies removed, the dollies can then be cranked using the handle 252 to turn the internal gears and retract the dollies 250 and place them in their retracted position. The dollies can be cranked up then without having to place excessive torque on the handle 252, which lessens the wear and tear on the dollies. In addition, it no longer will require excessive force to crank up the dollies so many more people will have the capability to move the crank up the dollies. The dolly saving system also reduces the number of injuries to workers. Other advantages include a time savings to the operator since the dollies can be cranked up with less effort.

After cranking up the dollies, the driver can then get into the truck or tow vehicle and release the park brake. The park brake release also disengages the controls to the dolly saver or variable length rod 540, 640. Releasing the air and the controls returns the semi tractor 110 to its normal height. Essentially, the variable length rod is lengthened so as to temporarily lift the back end of the semi tractor 110 and specifically to lift the frame 120 of the semi tractor to lift the semi trailer slightly using the air leveling system 300. This allows an operator or anyone else to crank up the dollies with little effort and with little opportunity for getting injured. The controls for lengthening the dolly saver or variable length rod 540, 640 are tied to an electrical signal for a light associated with engagement of the parking brake. Therefore, the controls such as control 142 that is within the cab 112 of the semi tractor 110, can only be used when the parking brake is engaged. Furthermore, when the parking brake is disengaged, the electrical signal is removed, therefore removing the controls and deflating the air cylinder 520, 620 to the dolly saver 540, 640, respectively.

Stated simply, the air leveling system of a tow vehicle is overridden for a short time while the vehicle is substantially stationary. The air leveling system is provided with an amount of air to lift the rear portion of the tow vehicle. For example, when the tow vehicle is a semi tractor trailer, the air leveling system raises the rear portion of the semi tractor trailer truck (which includes the fifth wheel) by as much as 2 inches. It should be understood, that this amount is within the normal operating range of the air leveling system while the semi tractor trailer truck is towing a trailer. As a result, the air bags of the air leveling system are not being over inflated. If the semi tractor trailer is positioned to hook up to a trailer, the 2 inch elevation lifts the trailer and removes the load from the dollies of the trailer so that they can be cranked up with less effort. Upon an indication that the tow vehicle will be moving or is moving, the override of the air leveling system is removed to allow the normal operation of the air leveling system. Such an indication can include a release of the parking brake, an engagement of a clutch, or placing a truck into gear, or the like. The override is removed in response to such indications.

FIG. 9A is a schematic diagram of the operator control mechanism 142 associated with the dolly saver, according to an example embodiment. The operator control mechanism 142 associated with the dolly saver, is typically placed in the cab of the tow vehicle. For example, in a semi tractor trailer truck, the control mechanism 142 can be placed under the seat so that the operator can operate the control either from within the cab or from outside the semi tractor trailer. In another embodiment, the control mechanism 142 can be placed into the dash board of a tow vehicle. The control mechanism 142 includes a relay 910, a pilot light 920, an air valve 930, and a momentary switch 940. In an unpowered position the air valve 930 remains closed. The air valve 930 remains closed and therefore disallows from an air source or air supply from being sent to the dolly saver 540, 640. The relay 910 is enabled from a power source. The power source used to enable the relay is the emergency park brake light on the dash of the semi-truck 110. Thus, when the parking brake is engaged, the light for the emergency brake is turned on. The power to the emergency light is then used to enable the relay and the control system or the controls 142. Thus, when the parking brake is engaged the controls 142 for the dolly saver are enabled and when the emergency brake is released power to the relay is disabled and thus the relay 910 and the controls 142 are disabled. The air valve 930 is shut when the controls are disabled. The controls also include a pilot light 920 and an air valve 930 and a momentary switch 940. The momentary switch controls power to the air valve 930. The momentary switch must be depressed in order to have the air valve open and allow air to go to the dolly saver. Air from the air supply line or air supply 310 is then delivered to the dolly saver. The air cylinder associated with the dolly saver, such as 520 and 620 (shown in FIGS. 5 and 6) lengthens the dolly saver thereby lifting up the frame 120 of the semi-tractor 110. The length of travel or the amount of lengthening that can be accomplished is fixed so as to prevent the air bags, such as 130, 132, 432 (shown in FIGS. 1, 3, and 4) are not over inflated. In one example embodiment the maximum length that the air cylinders can extend the variable length rod is approximately three inches. Of course, it should be understood, that for other applications the amount of extra travel or amount of extra length produced can be different. It should also be noted that, once invoked the dolly saver extends to its maximum length. When air is removed from the dolly saver, a spring within the air cylinder returns the dolly saver to its minimum length.

When the air bags raise the frame of the truck with respect to the axles the air bags also lift the semi-trailer off the ground and disengage the dolly 250 from the ground. This allows the dollies 250 (shown in FIG. 2) to be easily raised to the retracted position. The operator then jumps in the truck and disengages the emergency brakes before moving the truck. Disengaging the parking brake also disables or turns off the electrical signal to the brake light. In response to the brake light turning off, the controls 142 to the dolly saver are also disengaged. The air valve 930 returns to its default position where it turns off or shuts off the air supply to the dolly saver and the dolly saver (and more specifically the air cylinder 520, 620 of the dolly saver) bleeds off air allowing the trailer to return to its normal operating position. Using the parking brake light and the power that is fed to it as the power source for the controls 142 for the dolly saver also acts as a safety feature and prevents the operators from driving off with the dolly saver engaged or in an extended position. Generally trucks are not meant to operate at other than the minimum length between or non-extended length of the dolly saver, 640.

It should also be noted that the air supply can be simple T-fitting which is also shown in FIG. 9A. The simple T-fitting can be used to tap into an existing air supply line, such as an air supply used to supply air to the operator's seat. The air supply line is lengthened slightly by the T-fitting. Also attached to the T-fitting is an air supply lines that supplies the air cylinder 520, 620 associated with the dolly saver 540, 640, respectively. The T-fitting carries the reference number 999 in FIG. 9A. In some embodiments, the operation of the dolly saver can be implemented using a computing device such as a general purpose computer or a microprocessor that executes a set of instructions in the form of computer software or firmware associated with a device.

Figure 9B:
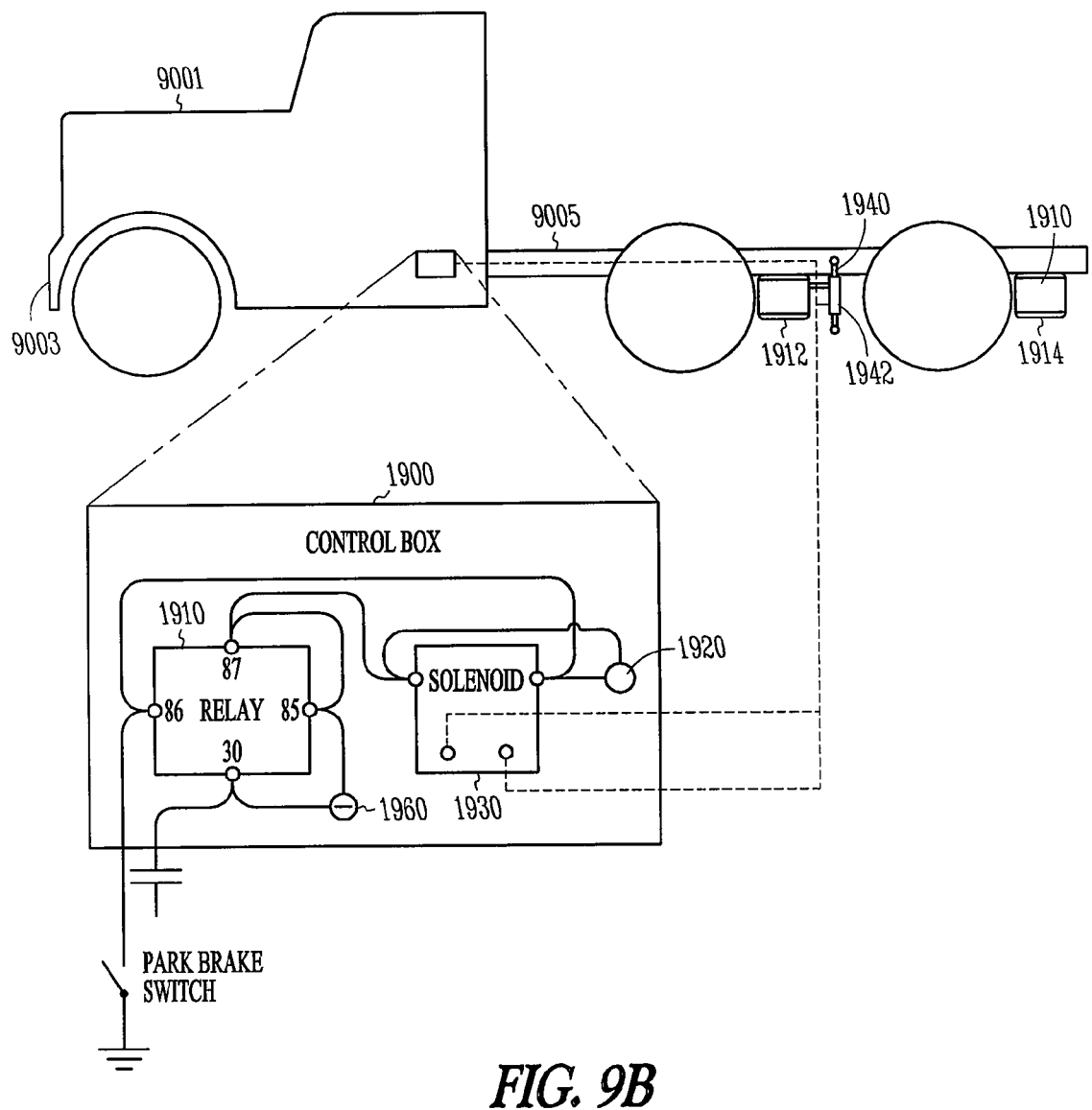
FIG. 9B is a schematic diagram of another operator control mechanism and a tow vehicle, according to an example embodiment.

FIG. 9B is a schematic diagram of another operator control mechanism a tow vehicle 9001, such as a semi tractor trailer truck, according to an example embodiment. The tow vehicle 9001 has a rear portion and a forward portion 9003. The tow vehicle also has a frame 9005 and axles. The semi tractor trailer truck 9001 also includes an air leveling system which include an air bag 1912 and an air bag 1914. Typically, each axle includes at least two air bags. Two air bags 1912 and 1914 are shown in this schematic since the truck 9001 is shown as a side view. The control mechanism includes a control box or control housing 1900 which may be placed in the cab of the tow vehicle 9001. For example, in a semi tractor trailer truck, the control box or control housing 1900 can be placed under the seat so that the operator can operate the control either from within the cab or from outside the semi tractor trailer. A relay 1910, a pilot light 1920, an air valve 1930, and a momentary switch 1960 are placed in the control box or control housing 1900. The relay 1910 is attached to a power source. The control mechanism also includes a variable length rod 1942 that connects between the frame 9005 of the semi tractor trailer truck 9001 and an actuator of the air leveling system. The variable length rod 1942 includes an air cylinder. The air valve 1930 is attached to the air cylinder of the variable length rod 1942. The air valve 1930 is also attached to an air supply. In this embodiment, the air supply is a source of compressed air for the seat within the cab of the truck 9001.

In the embodiment shown, the power source is the electrical system through the wire attached to the parking brake light. When the parking brake is disabled there is no power for the relay 1910. When the parking brake is set, power is delivered to the parking brake light and this same source of power is used to power the relay 1910. In an unpowered position the air valve 1930 remains closed and disallow air from an air source or air supply from being sent to the variable length rod 1942. The relay 1910 is enabled when the parking brake is set. As mentioned, the power source used to enable the relay is the emergency park brake light on the dash of the semi-truck 9001. Thus, when the parking brake is engaged, the light for the emergency brake is turned on. The power to the emergency brake light is then used to enable the relay 1910 and when the emergency brake is released, power to the relay 1910 is removed and thus the relay 1910 is disabled along with the air valve 1930. Thus, when the power to the emergency light is removed, control of the air leveling system through the control mechanism is prevented. The control mechanism is for a period during which the truck is substantially stationary. When the truck is underway, the control of the air leveling system defaults to the controls associated with normal operation.

In operation, the momentary switch 1960 is switched on when the tow vehicle is stationary because, otherwise there is no power delivered to the control box or control housing. The relay 1910 then delivers power to open the air valve 1930. The momentary switch 1960 must be depressed in order to have the air valve 1930 open and deliver compressed air to the air cylinder of the variable length rod 1942. The air cylinder associated with the variable length rod 1942 lengthens the rod and moves an actuator to invoke the air leveling system and to cause the air leveling system to lift or elevate the frame 9005 of the tow vehicle 9001. The length of travel or the amount of lengthening that can be accomplished is fixed so as to prevent the air bags, such as 1912 and 1914, from being over inflated. In one example embodiment the maximum length that the air cylinders can extend the variable length rod is approximately two to three inches. This value is within the normal operational range of the air bags. Of course, it should be understood, that for other applications the amount of extra travel or amount of extra length produced can be different The truck stays in a position with the elevated or lifted rear portion until power to the relay 1910 and the air valve 1930 is removed. In this embodiment the power to the relay is controlled by the power to the parking brake indicator light. When either of these events occurs, the controls default to the controls associated with normal operations. The truck is positioned to hook up to a trailer. Then, when the truck 9001 is stationary, the air leveling system is used to lift the truck and the trailer. This also removes the load of the trailer from the dollies. The dollies can then be cranked up with less effort and more quickly than when loaded. The truck is returned to level after the dollies are cranked up. This is done either by actuating the momentary switch or receiving an indication that the truck will or may be moving, such as when the parking brake is released, or the truck is placed in gear or the like.

In another embodiment, portions of the control mechanism, such as the relay 1910, the pilot light 1920, the air valve 1930, or the momentary switch 1960 can be placed into the dash board of a tow vehicle.

Figure 10:
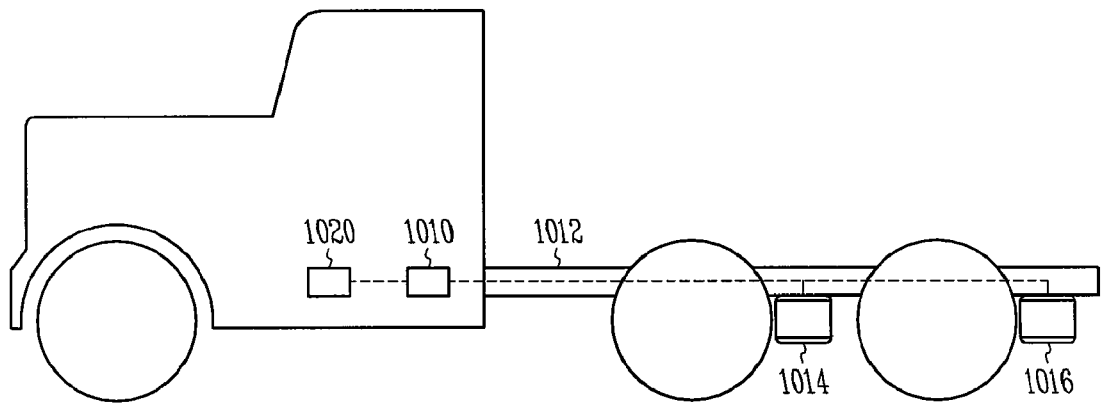
FIG. 10 is a schematic diagram of an apparatus for lifting a semi tractor trailer that is associated with a semi tractor truck, according to an example embodiment.

In another embodiment, lifting of the rear portion of the semi trailer may not involve moving the actuator arm or adding compressed air to a cylinder associated with the dolly saver. The inflation and the deflation of the air bag or air bags of the air leveling system will be controlled directly to lift a trailer thereby removing the load from the dolly or dollies associated with the trailer, such as a semi trailer. FIG. 10 is a schematic diagram of an apparatus for lifting a semi tractor trailer is associated with a semi tractor truck, according to an example embodiment. The apparatus 1000 includes a source of a compressed air or pressurized air 1010, and a delivery apparatus 1012 for selectively placing compressed into at least one airbag 1014 of an air leveling system 1016. The apparatus 1000 also includes a controller 1020 that only allows delivery of the compressed air to the airbag 1014 of the air delivery system 1016 when there is an indication that the tow vehicle or semi tractor trailer is substantially stationary, such as when a parking brake on the semi tractor truck has been set. In one embodiment, the controller 1020 releases another amount of air from the at least one bag 1014 of the air leveling system 1016 in response to an indication that the tow vehicle will be moved or is moving. One example of an indication that the tow vehicle will be moving includes the release of the parking brake on the semi tractor truck. The controller 1020 monitors the amounts of compressed air placed into and released from the at least one air bag 1014 of the air leveling system 1016. For example, the controller 1020 monitors the air leveling system 1016 so that the air leveling system 1016 operates within a normal operating range even when the air leveling system is being overridden to raise the rear portion of the tow vehicle. In one embodiment, the delivery apparatus 1012 includes a device for changing the length of a connecter between the air leveling system 1016 and a frame of the semi tractor trailer truck.

In operation, the controller 1020 controls the addition of air into the air bag 1014 of the air leveling system 1016. Air is placed into the airbag or airbags 1014 only after the parking brake of the truck has been set and the momentary switch has been activated. Air is removed from the airbags 1014 after the parking brake is released and the truck or tow vehicle controls default to the controls associated with normal operations. This substantially prevents an overriding of the air leveling system while the truck is underway. The controller 1020 also monitors the air leveling system during the override to assure that the amount of air added to the air leveling system 1016 does not go beyond a range associated with normal operating conditions of the air leveling system while the truck is underway. This assures that the air bag 1014 or air bags associated with the air leveling system 1016 will not be over inflated or blown. Once the load on the dolly or dollies is reduced, the dolly or dollies may be retracted by hand, or placed in a traveling position. Before the truck operator is able to get underway, the parking brake must be released. In response to the parking brake being released, the air bag 1014 or air bags are deflated or the compressed air in the air bags is reduced to a position near the initial position when the truck was unloaded. Again, the controller 1020 monitors the air leveling system 1016 to assure that the amount of air removed from the air leveling system 1016 does not go beyond a range associated with normal operating conditions of the air leveling system 1016 while the truck is underway.

In still other embodiments, the control is accomplished with a purely mechanical system. An electronic controller, such as a microcontroller or microprocessor does not come into play.

Figure 11:
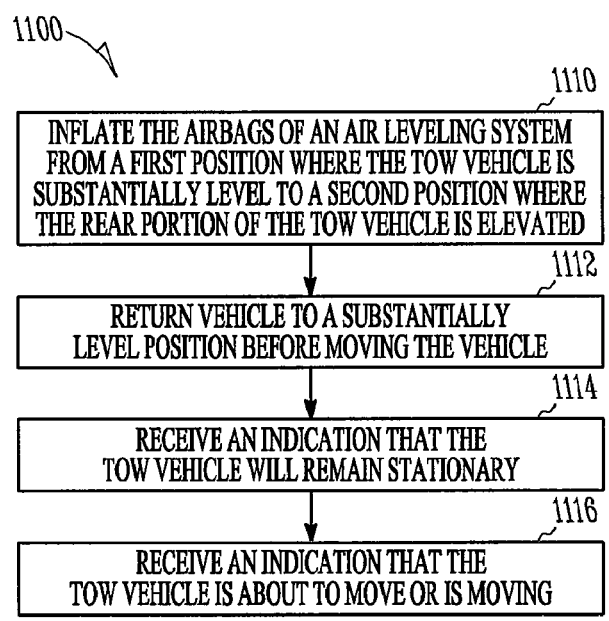
FIG. 11 is a flow diagram of a method for removing the load from the dollies of a semi trailer, according to an example embodiment.

FIG. 11 is a flow diagram of another method 1100, according to an example embodiment. The method 1100 is performed while a tow vehicle is substantially stationary. The method 1100 includes inflating the airbags of an air leveling system from a first position where the tow vehicle is substantially level to a second position where the rear portion of the tow vehicle is elevated 1110, and returning the tow vehicle to a substantially level position before moving the vehicle 1112. The method 1100 may also include receiving an indication that the tow vehicle will remain stationary 1114. In one embodiment, this may include setting a parking brake of the tow vehicle. The method 1100 may also include returning the tow vehicle to a substantially level position 1112 in response to receiving an indication that the tow vehicle is about to move or is moving 1116. In one embodiment, releasing the parking brake is an indication for returning the tow vehicle to a substantially level position. Other indication for returning the tow vehicle to a substantially level position include other events or placing the towing vehicle in gear. Inflation the airbags of an air leveling system to move the frame from the first, substantially level position, to the second position 1110 is accomplished within a range associated with the normal range of operation of the air leveling system. This prevents over inflation of the air bags. In one embodiment, inflating the airbags of an air leveling system includes changing the length of a rod attached between the axle of the tow vehicle and an actuator arm of the air leveling system. Changing the length of a rod includes elongating an air cylinder associated with the rod. This method is employed in hooking up a trailer to a tow vehicle, such as a semi tractor trailer. The tow vehicle is positioned to attach to a trailer. The tow vehicle then remains substantially stationary during the hook up operation. For example, the parking brake will be set during the hook up operation. After the tow vehicle is correctly positioned with respect to the trailer, the method can be employed to raise the rear portion of the tow vehicle which in turn raises the dollies off the ground. The dollies can then be cranked up to a travel position. The tow vehicle is then returned to a substantially level position before moving the tow vehicle either by an automatic shutoff or by manually disengaging a system. The air leveling system then operates normally as it would during travel of the tow vehicle or semi tractor trailer truck.

Figure 12:
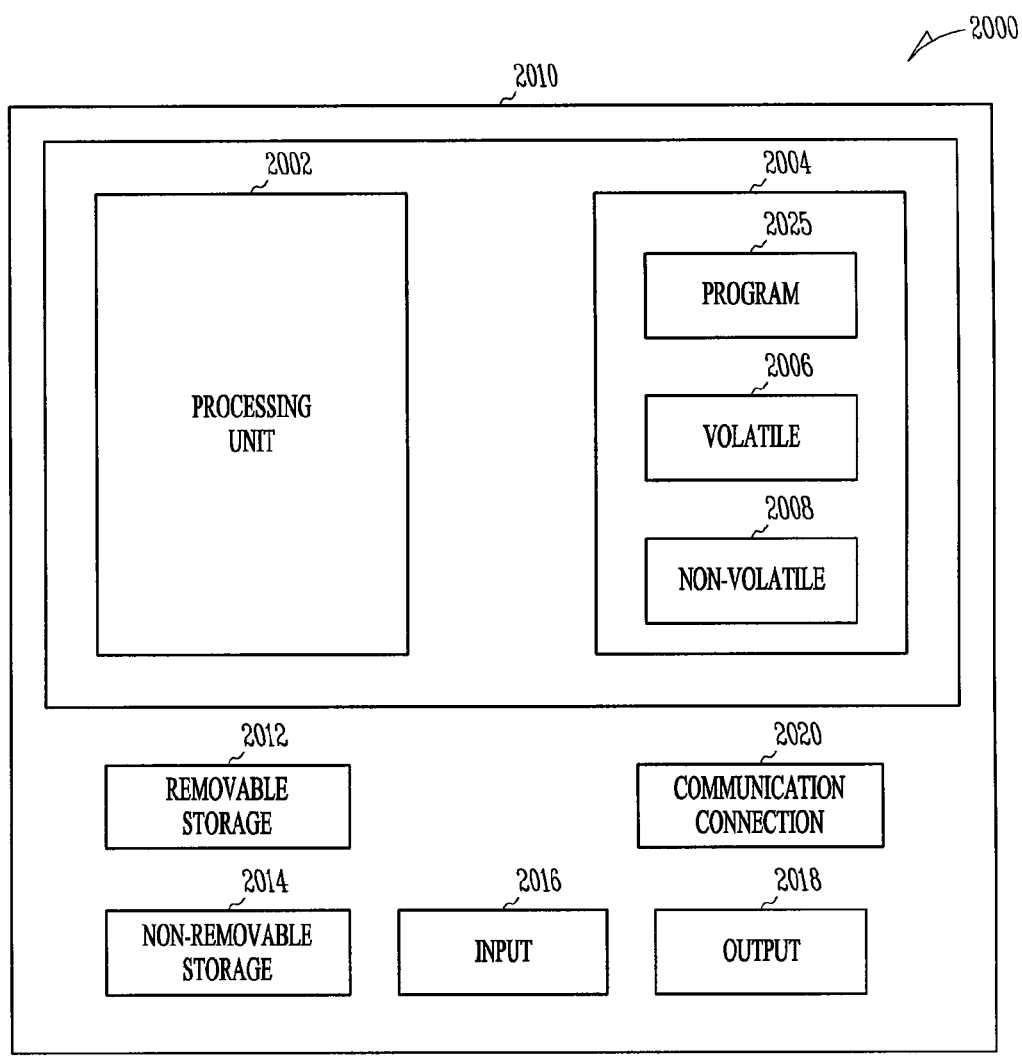
FIG. 12 is a block diagram of a computer system that executes programming for performing all or a portion of the above algorithm or methods, according to an example embodiment.

The controller 1020 may also be the control mechanism or controller 330 described and set forth in FIG. 3 above. The controller 1020 (shown in FIG. 10) may include one or more processors for implementing the instructions associated with all or a portion of the methods discussed above. FIG. 12 illustrates an example embodiment of a system 2000 that functions as a controller. FIG. 12 is a block diagram of a computer system that executes programming for performing all or a portion of the above algorithm or methods, according to an example embodiment. A general computing device in the form of a computer 2010, may include a processing unit 2002, memory 2004, removable storage 2012, and non-removable storage 2014. Memory 2004 may include volatile memory 2006 and non-volatile memory 2008. Computer 2010 may include, or have access to a computing environment that includes, a variety of computer-readable media, such as volatile memory 2006 and non-volatile memory 2008, removable storage 2012 and non-removable storage 2014. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 2010 may include or have access to a computing environment that includes input 2016, output 2018, and a communication connection 2020. One of the inputs could be a keyboard, a mouse, or other selection device. The communication connection 2020 can also include a graphical user interface, such as a display. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Figure 13:
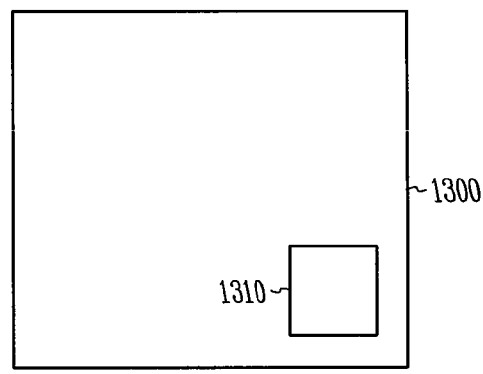
FIG. 13 is a schematic diagram of a computer readable medium that includes a set of instructions, according to an example embodiment.

FIG. 13 is a schematic diagram of a computer readable medium 1300 that includes a set of instructions 1310. The computer readable medium can be a memory module, a memory stick, a floppy disk, a hard disk, an internet connection to a remote server, or the like. Computer-readable instructions stored on a computer-readable medium are executable by the processing unit 2002 of the computer 2010. A hard drive, CD-ROM, and RAM are some examples of articles including a computer-readable medium. For example, a computer program 2025 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer system 2000 to provide generic access controls in a COM based computer network system having multiple users and servers.

In some instances, the controller may operate in accordance with a machine readable medium. A machine-readable medium comprising instructions, which when implemented by one or more processors perform the following operations: determining that a parking brake of a semi tractor trailer is set, and inflating the airbags of an air leveling system of a semi tractor trailer to move the airbags from a first position to a second position thereby placing a loading force from the trailer onto the air leveling system. When inflating the airbags of an air leveling system of a semi tractor trailer the air leveling system is operated within a normal range of operation. The first position and the second position are within the normal range of operation of the air leveling system. The machine-readable medium further causes the one or more processors to perform the following operations: determining that the parking brake of the semi tractor has been released, and deflating the airbags of an air leveling system of a semi tractor trailer in response to the parking brake being released. This moves the airbags from the second position to another position near the first position. Deflating the airbags of an air leveling system of a semi tractor trailer includes operating the air leveling system within a normal range of operation. In one embodiment, the instructions cause a connector between the air leveling system and the frame of a semi tractor trailer to elongate. In another embodiment, the machine-readable medium includes instruction for pumping a compressed air to a cylinder to elongate a connector between the air leveling system and the frame of a semi tractor trailer.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. An apparatus for a semi tractor truck comprising:
an air leveling system for maintaining a frame of the semi tractor truck in a substantially level state, the air leveling system including at least one airbag;
a source of pressurized air;
a delivery apparatus for placing pressurized air into the at least one airbag to lift a rear portion of the semi tractor truck; and
a control mechanism that allows delivery of the air between the source of pressurized air and the at least one airbag;
a relay coupled to the control mechanism and operable to provide power to the control mechanism when the relay is enabled at a time when the semi tractor truck is substantially stationary and the relay configured to prevent power delivery to the control mechanism when the relay is disabled.

2. The apparatus of claim 1 wherein the control mechanism releases an amount of air from the at least one airbag to return the frame to the substantially level state in response to an indication that the semi tractor truck will be moved.

3. The apparatus of claim 2 wherein the control mechanism is a mechanical system.

4. The apparatus of claim 2 wherein the control mechanism is a mechanical system and an electrical system.

5. The apparatus of claim 1 further comprising an air cylinder which can be used to move an actuator arm of the air leveling system.

6. The apparatus of claim 1 wherein the control mechanism includes a switch located in a cab of the semi tractor truck.

7. A system comprising:
  a vehicle suspension system including a plurality of air bags;
  a first switch operable to detect that the vehicle will be moved or is moving;
  a second switch operable to detect user input; and
  a control mechanism coupled to an inflation system, the inflation system coupled to the plurality of air bags, the control mechanism configured to supply air to the plurality of air bags in response to operation of the second switch and a signal from the first switch to indicate that the vehicle is substantially stationary and configured to release air in response to a signal from the first switch that indicates the vehicle will be moved or is moving.

8. The system of claim 7 wherein the second switch is a momentary contact switch.

9. The system of claim 7 wherein the second switch is located in a cab of the vehicle.

10. The system of claim 7 wherein the first switch is coupled to at least one of the clutch of the vehicle, a parking brake of the vehicle, or a transmission of the vehicle.

* * * * *